(12) United States Patent
Maki et al.

(10) Patent No.: US 8,662,752 B2
(45) Date of Patent: Mar. 4, 2014

(54) MOTION GUIDE DEVICE AND METHOD OF MANUFACTURING SAME

(75) Inventors: Nobuyuki Maki, Tokyo (JP); Fukuji Nakano, Tokyo (JP); Shigemi Nakamura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/520,933

(22) PCT Filed: Jan. 6, 2011

(86) PCT No.: PCT/JP2011/000014
§ 371 (c)(1),
(2), (4) Date: Aug. 23, 2012

(87) PCT Pub. No.: WO2011/083759
PCT Pub. Date: Jul. 14, 2011

(65) Prior Publication Data
US 2012/0328221 A1  Dec. 27, 2012

(30) Foreign Application Priority Data
Jan. 8, 2010  (JP) .................................. 2010-003232

(51) Int. Cl.
  *F16C 33/10*  (2006.01)
  *F16C 29/06*  (2006.01)
(52) U.S. Cl.
  USPC ............... 384/13; 384/43; 384/45; 29/898.03
(58) Field of Classification Search
  USPC .................... 384/13, 15, 44–45; 29/898.03
  See application file for complete search history.

(56) References Cited

U.S. PATENT DOCUMENTS 4,850,720 A * 7/1989 Osawa ............................ 384/13
4,886,374 A  12/1989 Osawa
(Continued)

FOREIGN PATENT DOCUMENTS

JP  04-194413 A  7/1992
JP  06-002024 Y2  1/1994
(Continued)

OTHER PUBLICATIONS

International Search Report of PCT/JP2011/000014, mailing date of Feb. 1, 2011.

*Primary Examiner* — Marcus Charles
(74) *Attorney, Agent, or Firm* — Westerman, Hattori, Daniels & Adrian, LLP

(57) ABSTRACT

A motion guide device has a moving block mounting surface 501 of an end plate 5 formed in a planar shape and a thinned-down portion 52 formed in an opposing moving block mounting surface 502. Moreover, in this motion guide device, a lubrication path 30 includes: a first lubrication path 30a formed extending in a horizontal direction from a surface of side surfaces parallel to a longer direction of a track rail 1 in the end plate 5 to a central portion of the end plate 5; a second lubrication path 30b formed in the central portion of the end plate 5; and a third lubrication path 30c connected to the second lubrication path and formed in a groove shape in the moving block mounting surface 501 of the end plate 5, and, moreover, the first lubrication path 30a is formed in a hollow shape continuous to inside a built-up portion 52a appended to the thinned-down portion 52 of the end plate 5. Having such a configuration enables this motion guide device to achieve an average dispersal of lubricant to each of rolling element circulation paths regardless of mounting position of a greasing nipple with respect to the end plate, type of lubricant, and so on.

9 Claims, 4 Drawing Sheets

(56) References Cited

U.S. PATENT DOCUMENTS

| | | | |
|---|---|---|---|
| 4,921,358 A | 5/1990 | Kasuga et al. | |
| 5,139,347 A * | 8/1992 | Hattori | 384/15 |
| 5,193,914 A | 3/1993 | Tanaka | |
| 5,380,096 A * | 1/1995 | Tanaka | 384/45 |
| 5,380,097 A * | 1/1995 | Tanaka | 384/44 |
| 5,509,736 A | 4/1996 | Keller et al. | |
| 2002/0136472 A1 | 9/2002 | Mochizuki et al. | |
| 2006/0023978 A1 * | 2/2006 | Haub | 384/13 |
| 2007/0053619 A1 * | 3/2007 | Kuwabara | 384/13 |
| 2007/0258667 A1 * | 11/2007 | Dorn et al. | 384/13 |
| 2009/0304312 A1 * | 12/2009 | Horie et al. | 384/13 |

FOREIGN PATENT DOCUMENTS

| | | | |
|---|---|---|---|
| JP | 06-019857 Y2 | 5/1994 | |
| JP | 07-151145 A | 6/1995 | |
| JP | 2002-054633 A | 2/2002 | |
| JP | 2005-207469 A | 8/2005 | |
| JP | 2008133836 A * | 6/2008 | F16C 33/66 |

\* cited by examiner

Cross-section along line II ~ II

MOTION GUIDE DEVICE AND METHOD OF MANUFACTURING SAME

CROSS-REFERENCE TO RELATED APPLICATIONS

This application is a National Stage of International Application No. PCT/JP2011/000014, filed Jan. 6, 2011, and claims priority to Japanese Applicatiom No. JP 2010-003232, filed Jan. 8, 2010, the entire contents of both which are herein incorporated by reference.

TECHNICAL FIELD

The present invention relates to a motion guide device such as a linear guide or the like for guiding linear or curved motion of a moving body such as a table or the like, and a method of manufacturing the same.

BACKGROUND ART

A motion guide device having a rolling element such as a ball, a roller, or the like acting to mediate as a mechanical element for guiding linear or curved motion of a moving body such as a table or the like in a guide portion of the motion guide device allows nimble movement to be achieved and is therefore utilized in various fields such as those of robots, machine tools, semiconductor and liquid crystal manufacturing devices, medical equipment, and so on.

A linear guide which is one kind of motion guide device comprises a track rail attached to a base and a moving block assembled in a relative-motion-enabling manner on the track rail and being attached with a moving body. A rolling element rolling unit is formed in the track rail, the rolling element rolling unit extending along a longer direction of the track rail. A load rolling element rolling unit opposing the rolling element rolling unit is formed in the moving block, and a rolling element circulation path for circulating rolling elements is also provided in the moving block. The rolling elements are arranged in a freely rolling manner between a ball rolling unit in the track rail and a load ball rolling groove in the moving block. When the moving block performs linear motion relatively to the track rail, the rolling elements arranged between the track rail and the moving block move by rolling and the rolling element circulation path circulates.

When using this kind of rolling type motion guide device, good lubrication is required, that is, it is required to create a film of oil between the rolling elements and a rolling surface, and prevent metal and metal making direct contact. This is because if the device is used as is without oil being supplied, friction between the rolling elements and the rolling surface increases resulting in a short operating life.

Various kinds of systems exist among methods of lubricant oil supply in the motion guide device. One such system has oil supply performed via a greasing nipple attached to the moving block of the motion guide device. Generally, the greasing nipple is attached to end plates attached to both of front and rear end surfaces of the moving block, and a lubricant supply path linking this greasing nipple and the rolling element circulation path is formed in an interior of the moving block and a side contacting an end surface of the moving block, and when a lubricant of oil, grease or the like is supplied to the greasing nipple, the lubricant is coated on the rolling elements via the lubricant supply path.

The lubricant supply path formed in the end plates is required to divide supply of the lubricant uniformly among multiply-existing rolling element circulation paths, and, for example, Patent Document 1 mentioned below discloses a configuration in which a plurality of lubricant supply paths respectively linking a greasing nipple and each of rolling element circulation paths are formed to be substantially uniform regarding the likes of shape, formation position, and path length. Patent Document 1 mentioned below, by the plurality of lubricant supply paths having a substantially uniform configuration, allows supply of the lubricant to be divided averagely among each of the rolling element circulation paths, whereby appropriate lubrication is realized.

Incidentally, an attachment position of the greasing nipple attached to the end plates requires to be changed arbitrarily in response to conditions of use of the motion guide device, peripheral environment, and so on, specifically, it is required to configure such that mounting can be performed at front and rear ends, left and right side surfaces and so on in a moving direction of the moving block with respect to the track rail. Accordingly, the conventional technology represented in the likes of Patent Document 1 mentioned below also has an oil-injection hole formed in a front surface, left and right side surfaces, and so on of end plates, and adopted a configuration such that the greasing nipples can be mounted with respect to the oil-injection hole at these arbitrary positions.

PRIOR ART DOCUMENTS

Patent Document

[Patent Document 1] JP 2005-207469 A

DISCLOSURE OF INVENTION

Problems to be Solved by the Invention

Forming an oil-injection hole on the left and right side surfaces of the end plates requires hole-opening processing of a comparatively long distance, hence problems in manufacturing technology existed. That is, when performing hole-opening processing of a comparatively long distance such as from a surface of the end plate side surface to a central portion, consideration must be given to removal of grinding dust and so on generated by the processing, hence a large hole diameter must be opened. This fact is indicated also in the drawings disclosed in above-mentioned Patent Document 1, where an oil-injection hole having an extremely large hole diameter is formed in the left and right side surfaces of the end plate.

However, lubricants include oil and grease which have largely differing viscosities. Moreover, ease of flow when passing through the lubricant supply path differ considerably between oil and grease. Grease is gel-like and has a high viscosity. Hence, in order to supply grease at low pressure, resistance of the lubricant supply path must be reduced. In order to reduce the resistance, a diameter of the lubricant supply path must be increased. On the other hand, oil is liquid form, has a low viscosity, and flows smoothly through the lubricant supply path. Therefore, in order to supply oil optimally, the diameter of the lubricant supply path must be reduced.

However, in the conventional technology represented by above-mentioned Patent Document 1, technology to form the oil-injection hole with a shape matched to the characteristics of the oil, that is, to form an oil-injection hole of small hole diameter, when performing supply of oil from the left and right side surfaces of the end plate, did not exist. This is because performing processing over a comparatively long distance and opening a hole of small diameter is extremely difficult.

The following are considered as means of solving the above-mentioned problems in manufacturing technology, namely, shortening the distance over which the oil-injection hole is opened, and also linking the oil-injection hole to positions along the way of the lubricant supply path. This is because if the distance of carrying out hole processing is shortened, the processing is made easy even for a hole of small diameter. However, when the oil-injection hole is linked to positions along the way of the lubricant supply path, it becomes impossible to divide supply of lubricant averagely among each of the rolling element circulation paths, whereby appropriate lubrication cannot be realized.

The present invention was made in view of the above-mentioned problems, and an object of the present invention is to provide a motion guide device having a new lubricant supply path which enables an average division of supply of a lubricant among each of rolling element circulation paths and is hence capable of realizing appropriate lubrication, whatever place a mounting position of a greasing nipple on an end plate is, and whatever kind the lubricant is. Therefore, the present invention provides a device configuration and means of processing for forming the above-described new lubricant supply path.

Means for Solving the Problems

A motion guide device according to the present invention comprises: a track member in which a rolling element rolling unit is formed; a moving block in which a load rolling element rolling unit is formed and including a rolling element return path, the load rolling element rolling unit opposing the rolling element rolling unit, and the rolling element return path extending substantially parallel to the load rolling element rolling unit; a pair of cover members formed at both of front and rear ends in a moving direction of the moving block and including a direction change path connecting the load rolling element rolling unit and the rolling element return path; a plurality of rolling elements arranged in a freely rolling manner within a rolling element circulation path configured by the load rolling element rolling unit, the rolling element return path, and the direction change path; and a lubrication path provided in at least one of the pair of cover members and configured to supply a lubricant to the rolling element circulation path, the lubrication path including: a first lubrication path formed extending in a horizontal direction from a surface of at least one of left and right side surfaces parallel to a longer direction of the track member in the cover member to a central portion of the cover member; a second lubrication path connected to the first lubrication path and formed in the central portion of the cover member; and a third lubrication path connected to the second lubrication path and formed in a groove shape in a moving block mounting surface of the cover member to thereby cooperate with the moving block to form a path from the second lubrication path of the lubrication path to the rolling element circulation path, the first lubrication path being formed in a hollow shape continuous to inside a built-up portion appended to a thinned-down portion of the cover member.

Moreover, another motion guide device according to the present invention comprises: a track member in which a rolling element rolling unit is formed; a moving block in which a load rolling element rolling unit is formed and including a rolling element return path, the load rolling element rolling unit opposing the rolling element rolling unit, and the rolling element return path extending substantially parallel to the load rolling element rolling unit; a pair of cover members formed at both of front and rear ends in a moving direction of the moving block and including a direction change path connecting the load rolling element rolling unit and the rolling element return path; a plurality of rolling elements arranged in a freely rolling manner within a rolling element circulation path configured by the load rolling element rolling unit, the rolling element return path, and the direction change path; and a lubrication path provided in at least one of the pair of cover members and configured to supply a lubricant to the rolling element circulation path, a moving block mounting surface of the pair of cover members being formed in a planar shape and a thinned-down portion being formed in an opposing moving block mounting surface which is an opposing surface of the moving block mounting surface, a built-up portion being appended to the thinned-down portion of the cover members to form a part of the lubrication path, and a lower hole being formed in the built-up portion to guide a tool during processing of the lubrication path.

In addition, a method of manufacturing a motion guide device according to the present invention, the motion guide device comprising: a track member in which a rolling element rolling unit is formed; a moving block in which a load rolling element rolling unit is formed and including a rolling element return path, the load rolling element rolling unit opposing the rolling element rolling unit, and the rolling element return path extending substantially parallel to the load rolling element rolling unit; a pair of cover members formed at both of front and rear ends in a moving direction of the moving block and including a direction change path connecting the load rolling element rolling unit and the rolling element return path; a plurality of rolling elements arranged in a freely rolling manner within a rolling element circulation path configured by the load rolling element rolling unit, the rolling element return path, and the direction change path; and a lubrication path provided in at least one of the pair of cover members and configured to supply a lubricant to the rolling element circulation path, a moving block mounting surface of the pair of cover members being formed in a planar shape and a thinned-down portion being formed in an opposing moving block mounting surface which is an opposing surface of the moving block mounting surface, comprises: appending a built-up portion to the thinned-down portion of the cover members and forming in advance in said built-up portion a lower hole for guiding a tool, and performing hole processing utilizing said lower hole to thereby form at least a part of the lubrication path.

Effects of the Invention

The present invention enables provision of a motion guide device having a new lubricant supply path which enables an average division of supply of a lubricant among each of rolling element circulation paths and is hence capable of realizing appropriate lubrication, whatever place a mounting position of a greasing nipple on an end plate is, and whatever kind the lubricant is, and a method of manufacturing the motion guide device.

MODE FOR CARRYING OUT THE INVENTION

Preferred embodiments for carrying out the present invention are described below with reference to the drawings. The following embodiments are not intended to limit the inventions set forth in the claims, and the combinations of features described in the embodiments are not all necessarily indispensable for the means for solving the problem provided by the invention.

Figure 1:
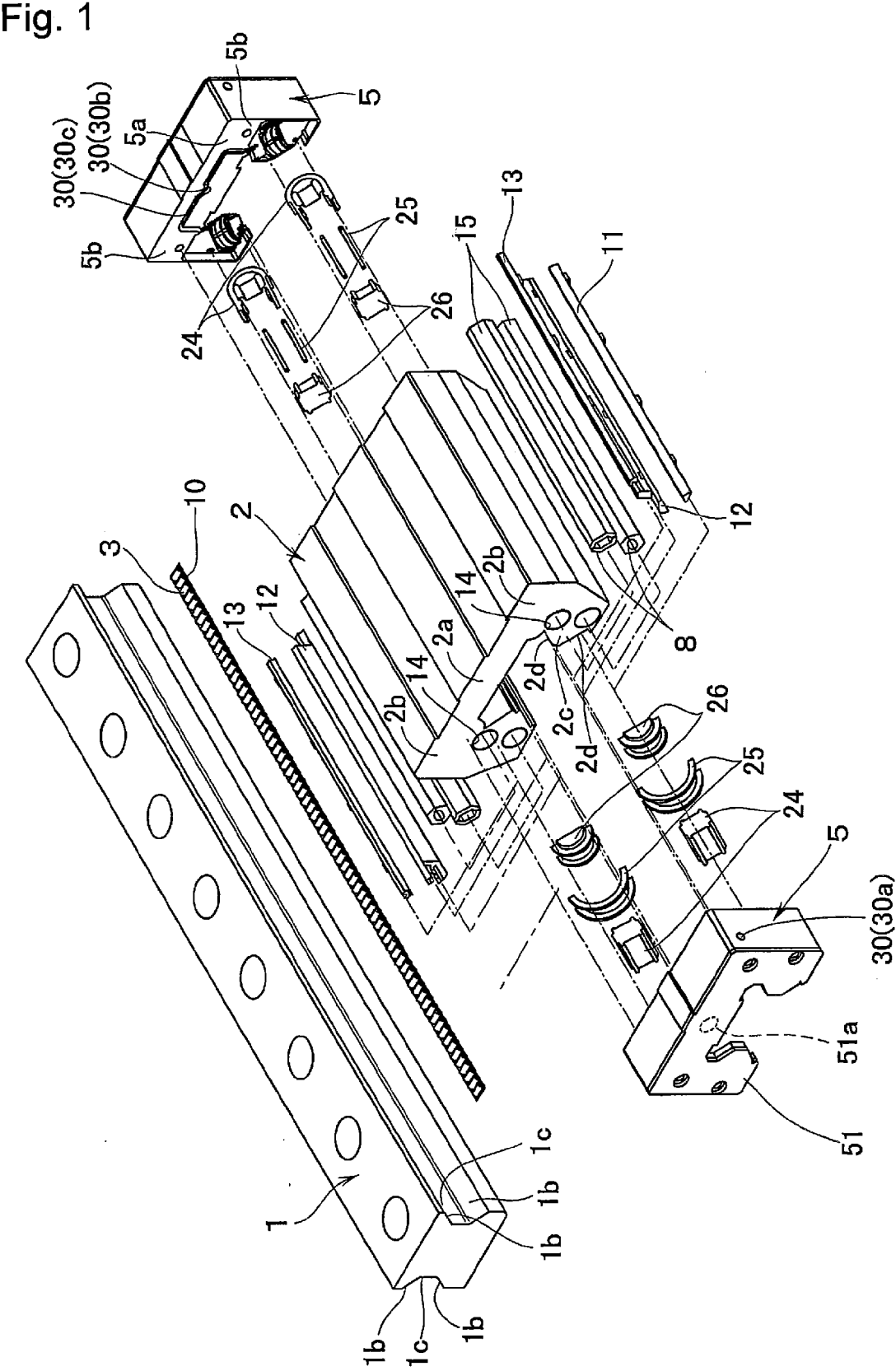
FIG. 1 is a view showing a linear guide acting as a motion guide device according to the present embodiment and, specifically, shows an exploded perspective view of the linear guide.
Figure 2A:
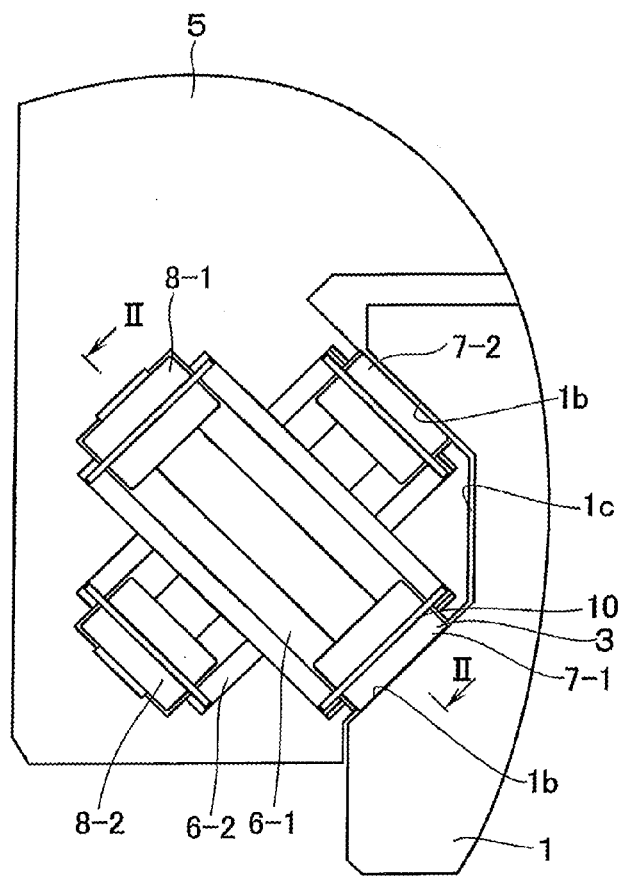
FIG. 2A is a view showing a linear guide acting as a motion guide device according to the present embodiment and, specifically, shows main parts of a circulation structure of the linear guide.
Figure 2B:
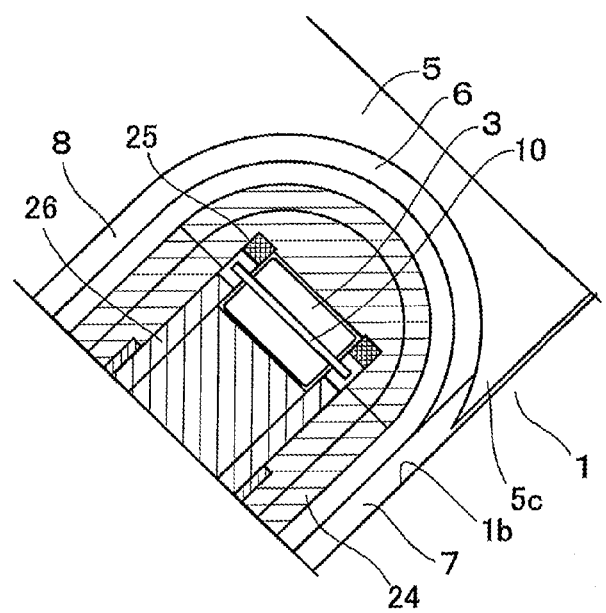
FIG. 2B is a cross-sectional view of FIG. 2A, taken along line II-II.

FIGS. 1, 2A and 2B are views showing a linear guide acting as a motion guide device according to the present embodiment and, specifically, FIG. 1 shows an exploded perspective view of the linear guide, and FIG. 2A shows main parts of a circulation structure of the linear guide. FIG. 2B is a cross-sectional view of FIG. 2A taken along line II-II.

The linear guide according to the present embodiment comprises a track rail 1 extending linearly acting as a track member, and a moving block 2 provided freely movably back and forth on this track rail 1 via several rollers 3 acting as rolling elements, and guides linear motion of a moving object such as a table or the like. In this embodiment, in order to realize high rigidity, rollers 3 of low elastic deformation are used for the rolling elements. However, other rolling elements, such as balls, roller bearings, or the like, may of course be used. In addition, a rail lower surface is in contact with a base, and is fixed to the base by a bolt or the like directed from a rail upper surface to the rail lower surface.

The track rail 1 is a member having a substantially square shape in cross-section and extended linearly long and thin. Formed on left and right side surfaces of the track rail 1 are roller rolling surfaces 1b along a longer direction of which the rollers 3 roll, and a narrowed surface 1c. Provided on the left and right side surfaces of the track rail 1 are a total of four of the roller rolling surfaces 1b acting as rolling element rolling units, two each of the roller rolling surfaces 1b being provided upwardly and downwardly. The rollers 3 roll along these roller rolling surfaces 1b, hence the roller rolling surfaces 1b are manufactured giving attention to strength and surface roughness of the roller rolling surfaces 1b by, for example, performing grinding processing after hardening the roller rolling surfaces 1b.

The moving block 2 comprises a central portion 2a opposing an upper surface of the track rail 1, and side wall portions 2b extending downwardly from both of left and right sides of the central portion 2a to oppose the left and right side surfaces of the track rail 1. Formed in each of the side wall portions 2b of the moving block 2 is a protruding portion 2c having a shape matched to a shape of the side surfaces of the track rail 1. Formed in this protruding portion 2c are load roller rolling surfaces 2d acting as load rolling element rolling units corresponding to the roller rolling surfaces 1b. A total of four of the load roller rolling surfaces 2d are provided two each above and below to the left and right side wall portions 2b of the moving block 2. The rollers 3 roll also along these load roller rolling surfaces 2d, hence the load roller rolling surfaces 2d are manufactured giving attention to strength and surface roughness of the load roller rolling surfaces 2d by, for example, performing grinding processing after hardening the load roller rolling surfaces 2d.

A plurality of the steel rollers 3 are arranged between the roller rolling surfaces 1b of the track rail 1 and the load roller rolling surfaces 2d of the moving block 2. The plurality of rollers 3 are held in sequence in a freely rotatable and slidable manner by a roller cage 10.

Formed in each of the side wall portions 2b of the moving block 2 are through-holes 14 extending in parallel separated by a certain distance from the two upper and lower load roller rolling surfaces 2d. Inserted in each of these through-holes 14 is a roller return path configuring member 15 that configures a roller return path 8. The roller return path configuring member 15 comprises a pair of pipe halves that have a long and thin member of a pipe shape divided in two along an axis direction. The roller return path 8 is formed on an inner periphery of the roller return path configuring member 15. The roller return path configuring member 15, after being inserted in the through-hole 14, has both ends held by end plates 5 to be fixed in the moving block 2.

Attached to both of left and right side edges of the load roller rolling surfaces 2d of the moving block 2 are holding members 11, 12, and 13 which are elongated and made of resin. A guide groove that guides the roller cage 10 is formed in the holding members 11, 12, and 13 so as to prevent the rollers 3 from dropping out of the load roller rolling surfaces 2d when the moving block 2 is removed from the track rail 1. A first holding member 11 guides a lower side of the roller cage 10 moving along the lower side load roller rolling surface 2d. A second holding member 12 guides an upper side of the roller cage 10 moving along the lower side load roller rolling surface 2d and guides a lower side of the roller cage 10 moving along the upper side load roller rolling surface 2d. A third holding member 13 guides an upper side of the roller cage 10 moving along the upper side load roller rolling surface 2d.

Two each of load roller rolling paths 7-1 and 7-2 (refer to FIG. 2A) configured from the roller rolling surfaces 1b of the track rail 1 and the load roller rolling surfaces 2d of the moving block 2 are respectively provided to the left and right side wall portions 2b of the moving block 2. Two each of roller return paths 8-1 and 8-2 (refer to FIG. 2A) configured from the roller return path configuring members 15 are provided upwardly and downwardly to the left and right side wall portions 2b of the moving block 2. The end plates 5 are each provided with direction change paths 6-1 and 6-2 that cause graded crossing of these load roller rolling paths 7-1 and 7-2 and roller return paths 8-1 and 8-2.

The end plates 5 acting as cover members are attached to both of front and rear end surfaces in a moving direction of the moving block 2. The end plates 5 have a cross-sectional shape substantially identical to that of the moving block 2, and comprise a horizontal portion 5a contacting the central portion 2a of the moving block 2 and a side wall portion 5b contacting the side wall portion 2b of the moving block 2 (refer to FIG. 1). As shown in FIG. 2, an outer direction change path 6-1 of the side wall portion 5b connects the lower side load roller rolling path 7-1 and the upper side roller return path 8-1. An inner direction change path 6-2 of the side wall portion 5b connects the upper side load roller rolling path 7-2 and the lower side roller return path 8-2. That is, the outer direction change path 6-1 and the inner direction change path 6-2 are connected such that the load roller rolling paths 7 and roller return paths 8 undergo graded crossing. As shown in FIG. 1, the outer direction change path 6-1 and the inner direction change path 6-2 are configured by the end plates 5, inner/outer direction change path configuring members 24, and inner direction change path configuring members 26. FIG. 2A shows a state where the inner/outer direction change path configuring members 24 and the inner direction change path configuring members 26 have been removed from the end plates 5.

Each of the inner/outer direction change path configuring members 24 is formed in a substantially U-shaped overall shape. An inner peripheral side of the outer direction change path 6-1 is formed on an outer peripheral side of the inner/outer direction change path configuring member 24, and an outer peripheral side of the inner direction change path 6-2 is formed on an inner peripheral side of the inner/outer direction change path configuring member 24. Moreover, when the inner/outer direction change path configuring member 24 is inserted in the end plate 5, the outer direction change path 6-1 is configured by the outer peripheral side of the outer direction change path 6-1 formed in the end plate 5 and the outer peripheral side of the inner/outer direction change path configuring member 24. In addition, the outer peripheral side of the inner direction change path 6-2 is configured together with the outer peripheral side of the inner direction change path 6-2 formed in the end plate 5.

Each of the inner direction change path configuring members 26 is shaped like a cylinder split in half, and the inner peripheral side of the inner direction change path is formed on an outer peripheral surface of the inner direction change path configuring member 26. When this inner direction change path configuring member 26 is inserted in the end plate 5 after the inner/outer direction change path configuring member 24 has been inserted in the end plate 5, the inner direction change path 6-2 is configured by the end plate 5 and the inner direction change path configuring member 26.

Cage guide members 25 are installed between the inner/outer direction change path configuring members 24 and the inner direction change path configuring members 26. When the outer peripheral side of the inner direction change path 6-2 is configured by the end plate 5 and the inner/outer direction change path configuring member 24, a difference in level occurs at a join of the end plate 5 and the inner/outer direction change path configuring member 24. The cage guide members 25 are provided to avoid this difference in level occurring in the outer peripheral side of the inner direction change path 6-2. The cage guide members 25 are formed in a U shape overall and extend along a complete length of the outer peripheral side of the inner direction change path 6-2.

A method of assembling the linear guide is described. First, the holding members 11, 12, and 13, and the roller return path configuring members 15 are installed in the moving block 2. Next, the inner/outer direction change path configuring members 24, the cage guide members 25, and the inner direction change path configuring members 26 are inserted sequentially in the end plate 5, and the end plate 5 is attached to either one of both the front and rear end surfaces of the moving block 2. In this state, the rollers 3 held in line in the roller cage 10 are inserted in the inner and outer circulation paths. Finally, the inner direction change path configuring members 26, the cage guide members 25, the inner/outer direction change path configuring members 24, and the end plate 5 are installed sequentially in an end surface on an opposite side (the other one of both the front and rear end surfaces) of the moving block 2.

When the moving block 2 is moved relatively to the track rail 1, the plurality of rollers 3 move by rolling along the load roller rolling path between the roller rolling surfaces 1b of the track rail 1 and the load roller rolling surfaces 2d of the moving block 2. As shown in FIG. 2A, the rollers 3 that have rolled to one end of the load roller rolling surface 2d of the moving block 2 are scooped up by a scooping-up portion 5c provided in the end plate 5, and, after being routed through the U-shaped direction change path 6, enter the roller return path 8 that extends in parallel to the load roller rolling path 7. The rollers 3 that have passed through the roller return path 8, after being routed through the direction change path on an opposite side, enter the load roller rolling path 7 again. The rollers 3 circulate a circuit-shaped roller circulation path configured by these load roller rolling path 7, direction change path 6, and roller return path 8. There are two circuit-shaped circulation paths, namely an inner and outer circulation path, hence rollers 3 circulate each of the inner and outer circulation paths.

In order to create a film of oil between the rollers 3 and the roller rolling surfaces 1b and load roller rolling surfaces 2d and thereby smoothly circulate the rollers 3 when using this kind of motion guide device, a lubrication path 30 for supplying a lubricant to the rollers 3 is provided in the end plate 5. Accordingly, next, a description of the lubrication path 30 according to the present embodiment is made with reference to FIGS. 3-6.

Figure 3:
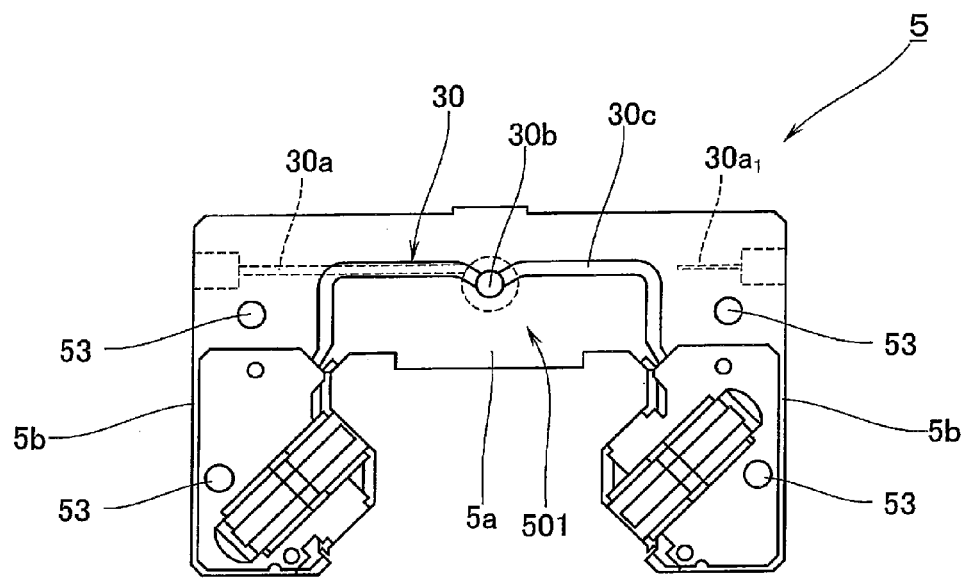
FIG. 3 is a view showing an end plate acting as a cover member according to the present embodiment and, specifically, is a view showing a moving block mounting surface of the end plate.
Figure 4:
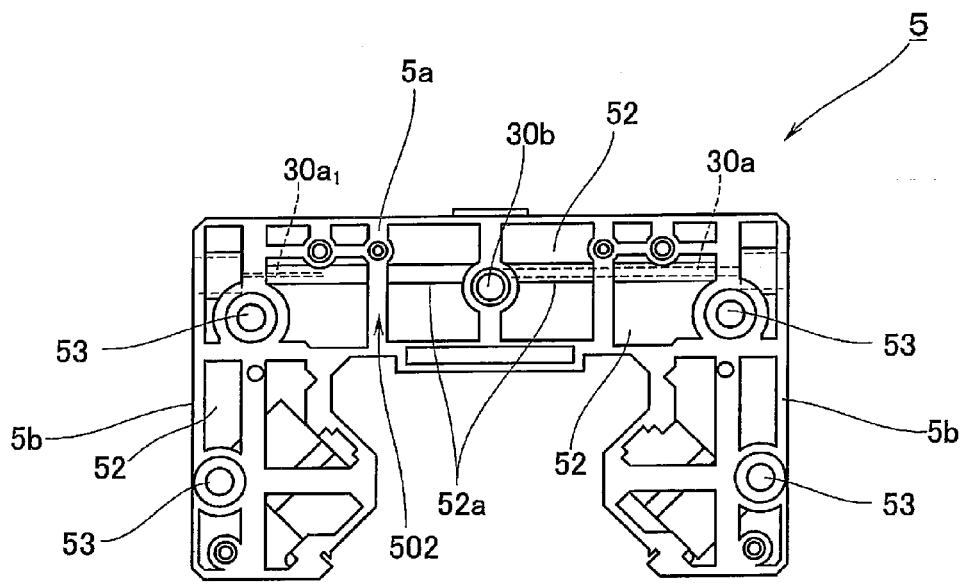
FIG. 4 is a view showing an end plate acting as a cover member according to the present embodiment and, specifically, is a view showing an opposing moving block mounting surface of the end plate.
Figure 5:
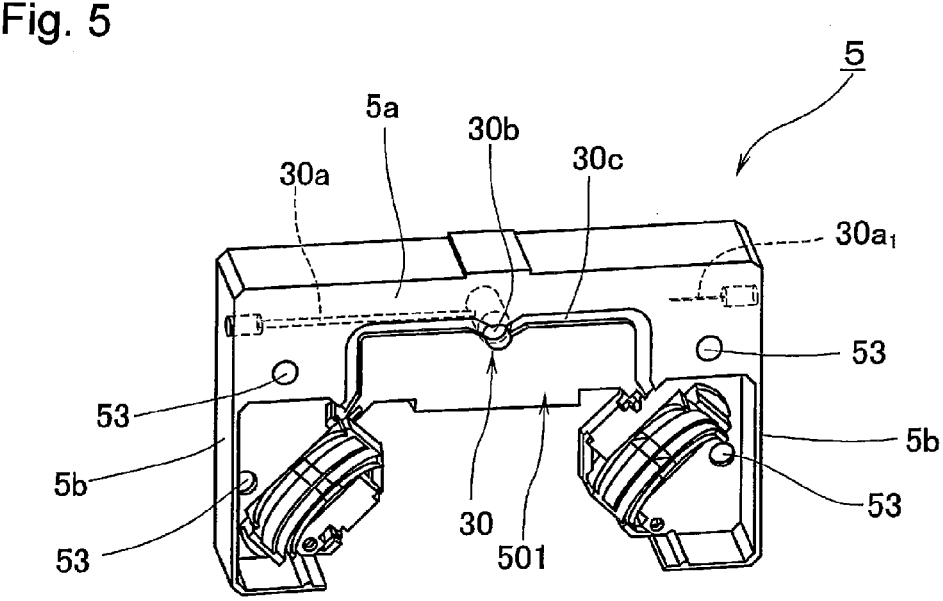
FIG. 5 is a view showing an end plate acting as a cover member according to the present embodiment and, specifically, is a perspective view showing an external appearance of the moving block mounting surface of the end plate when viewed obliquely from above.
Figure 6:
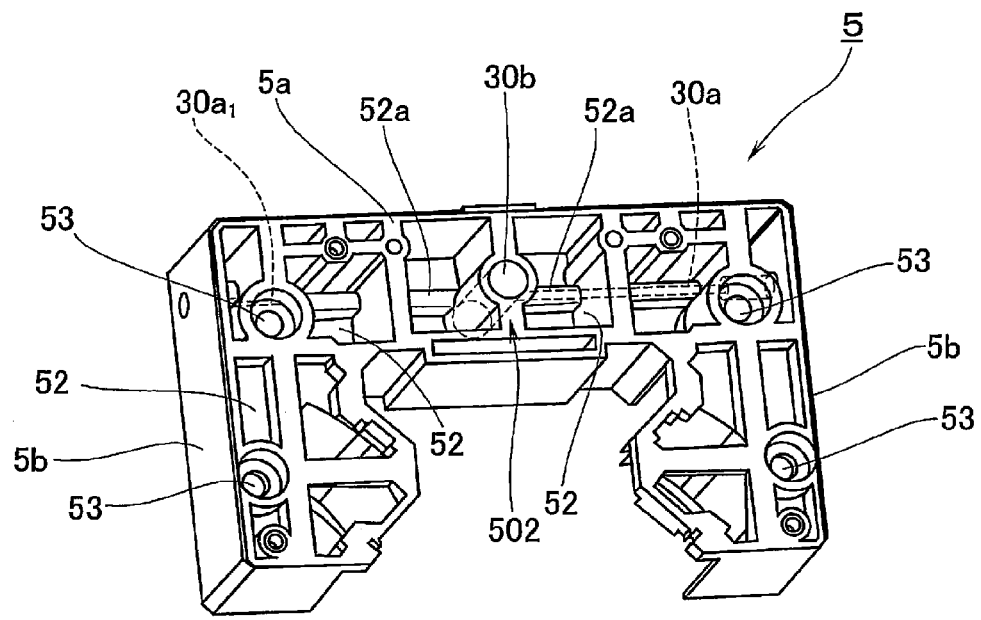
FIG. 6 is a view showing an end plate acting as a cover member according to the present embodiment and, specifically, is a perspective view showing an external appearance of the opposing moving block mounting surface of the end plate when viewed obliquely from below.

FIGS. 3-6 are views showing the end plate acting as the cover member according to the present embodiment and, specifically, FIG. 3 is a view showing a moving block mounting surface of the end plate, FIG. 4 is a view showing an opposing moving block mounting surface of the end plate, FIG. 5 is a perspective view showing an external appearance of the moving block mounting surface of the end plate when viewed obliquely from above, and FIG. 6 is a perspective view showing an external appearance of the opposing moving block mounting surface of the end plate when viewed obliquely from below. Note that the end plates 5 shown in FIG. 3-6 are shown in a state where the inner/outer direction change path configuring members 24, the cage guide members 25, and the inner direction change path configuring members 26 are removed.

The end plate 5 according to the present embodiment is a member in which a moving block mounting surface 501 is formed in a planar shape (refer to FIG. 3) and thinned-down portions 52 are formed in an opposing moving block mounting surface 502 which is an opposing surface of said moving block mounting surface 501 (refer to FIG. 4). As shown in FIG. 3, the moving block mounting surface 501 being formed in a planar shape has an object of improving adhesion of the moving block 2 and the end plate 5 by increasing a contact surface with the moving block 2, and of preventing the likes of leakage of lubricant from a boundary surface of these two members. Specifically, in the present embodiment, good connection between the moving block 2 and the end plate 5 is made realizable by having the following, namely, bolt holes 53 used during attachment to the moving block 2, a later-described second lubrication path 30b and third lubrication path 30c, and regions other than places of formation of the inner direction change path 6-2 in a surface on a side where the moving block 2 is mounted, all formed in a plane.

On the other hand, as shown in FIG. 4, the thinned-down portions 52 are formed in concentration on the opposing moving block mounting surface 502 of the end plate 5. The end plate 5 herein is a member manufactured by metal molding of resin, and in portions within an identical product where there is a block-shaped thickening, a concave portion is sometimes formed intentionally in a range not affecting quality of the product. This concave portion is the thinned-down portion 52, and is a shape adopted with an object of, for example, preventing occurrence of shrinkage, reducing manufacturing costs by reducing a used amount of resin which is the configuring material of the end plate 5, and so on.

As mentioned above, the thinned-down portions 52 according to the present embodiment are formed in concentration on the opposing moving block mounting surface 502, but the reason such a configuration is adopted is as a measure resulting from the fact that the moving block mounting surface 501 is formed in an extremely planar shape. In terms of metal mold manufacturing technology, it is easier to dispose thinned-down portions on both surfaces of the end plate 5 and disposing of thinned-down portions on both surface sides was performed also in conventional technology, but in the present embodiment, adoption of the thinned-down portions 52 shown specifically in FIGS. 4 and 6 has made it possible to dispose the thinned-down portions 52 in concentration on the opposing moving block mounting surface 502 of the end plate 5 as mentioned above.

Note that a gap exists between the track rail 1 and the moving block 2. However, in order to block this gap, in the present embodiment, as shown in FIG. 1, a seal plate 51 is mounted on the opposing moving block mounting surface 502 of the end plate 5, whereby foreign matter from external such as dust, and so on, is prevented from invading an interior of the moving block 2 from the above-described gap. Note that the seal plate 51 of the present embodiment combines also a function as a cosmetic plate covering the opposing moving block mounting surface 502 of the end plate 5.

The end plate 5 according to the present embodiment, while having a good shape as described above, also includes significant features in a configuration and method of formation of the lubrication path 30. That is, the end plate 5 according to the present embodiment, in an initial state of the end plate 5, includes the second lubrication path 30b in a central portion of the horizontal portion 5a, and includes the third lubrication path 30c connected to the second lubrication path 30b and formed in a groove shape on the moving block mounting surface 501 of the end plate 5.

The second lubrication path 30b is a hole continuously opened in a direction parallel to the moving direction of the moving block 2, and a side of the moving block mounting surface 501 of the end plate 5 is configured such that an opening of the second lubrication path 30b is closed by connection of the moving block 2 and the end plate 5. On the other hand, a side of the opposing moving block mounting surface 502 is closed by the seal plate 51. Note that a groove 51a is dug in a mounting position of the second lubrication path 30b in the seal plate 51 so as to be easily able to be opened when pressed by a tool such as a borer, and there is a configuration such that by pressing open a portion of this groove 51a for opening, continuity of a greasing nipple and the second lubrication path 30b when the greasing nipple is mounted in said places is realized.

The third lubrication path 30c is formed as a groove shape on the moving block mounting surface 501 of the end plate 5 and is thus configured capable of fulfilling a function as a path of the lubricant due to the moving block 2 and the end plate 5 cooperating when the moving block 2 and the end plate 5 are connected. Moreover, the third lubrication path 30c forms a path from the second lubrication path 30b to the rolling element circulation path (outer direction change path 6-1 and inner direction change path 6-2), and is configured capable of supplying lubricant sent from the second lubrication path 30b to the rolling element circulation path (outer direction change path 6-1 and inner direction change path 6-2) by a connection state of the moving block 2 and the end plate 5.

The above-mentioned second lubrication path 30b is positioned in the central portion of the horizontal portion 5a of the end plate 5, and the above-mentioned third lubrication path 30c is configured to enable an average division of supply of lubricant among each of the four rolling element circulation paths, since the four grooves linking the second lubrication path 30b and the four rolling element circulation paths are all formed in a substantially equal shape and path. Therefore, the second lubrication path 30b and the third lubrication path 30c according to the present embodiment allow appropriate lubrication to be realized.

Furthermore, the end plate 5 according to the present embodiment is configured to enable formation of a first lubrication path 30a extending in a horizontal direction from a surface of left and right side surfaces parallel to a longer direction of the track rail 1 in the end plate 5 toward a central portion of the end plate 5, that is, toward the second lubrication path 30b. This first lubrication path 30a is a lubrication path providing continuity through an interior of a built-up portion 52a built-up and appended in the thinned-down portion 52 of the end plate 5, and is configured capable of being formed in a tunnel-like hollow shape.

A lower hole $30a_1$ is formed in advance in an initial shape of the end plate 5 at places where this first lubrication path 30a is formable, and this lower hole $30a_1$ fulfills a function of guiding a tool during processing of the first lubrication path 30a. That is, during formation of the first lubrication path 30a, when a leading end of a processing tool such as a drill or the like is applied to the lower hole $30a_1$ and processing is begun, the drill penetrates the along this lower hole $30a_1$ shape, thereby enabling formation of the first lubrication path 30a advancing directly toward the second lubrication path 30b. In addition, the reason the first lubrication path 30a can be formed is because there is the built-up portion 52a configured from a semi-cylindrical shape built-up and appended in view of a hole diameter of the first lubrication path 30a formed as a tunnel-like hollow shape, hence causing processing conditions to be stable and allowing a good hollow shape to be formed. In other words, action of the lower hole $30a_1$ and the built-up portion 52a adopted in the present embodiment make it possible in the end plate 5 of the present embodiment shown in FIGS. 3-6 to process and form the first lubrication path 30a having a hole diameter $\phi$ of about 1 to 2 mm which was impossible in the conventional technology.

Note that the lower hole $30a_1$ formed in advance in the end plate 5 can be formed by inserting a core having a round bar shape in a formation position of said lower hole $30a_1$ when metal molding the end plate 5 and withdrawing this core after outer shape formation.

Moreover, processing involved in re-forming the once continuously formed first lubrication path 30a of small diameter to have a large diameter is easy, no special processing technology being required for the re-forming Therefore, the above-mentioned configurations of the lower hole $30a_1$ and the built-up portion 52a, in enabling formation of a first lubrication path 30a suitable for all lubricants, give rise to dramatic advantages compared to the conventional technology.

The first lubrication path 30a formed as above enables continuity to be achieved from the surface of the left and right side surfaces parallel to the longer direction of the track rail 1 in the end plate 5 to the second lubrication path 30b. Therefore, if it is desired to mount the greasing nipple on the side surfaces on the left and right sides of the end plate 5, the first lubrication path 30a is formed by the above-mentioned method of manufacturing, and the portion of the groove 51a for opening formed in the seal plate 51 is left unopened. Moreover, mounting the greasing nipple in a side surface opening of the first lubrication path 30a results in the lubrication path continuing from this greasing nipple to the first lubrication path 30a, second lubrication path 30b, and third lubrication path 30c being formed, and finally enables the lubricant to be supplied to the rolling element circulation path (outer direction change path 6-1 and inner direction change path 6-2).

The above has enabled establishment of technology for processing and forming the aforementioned first lubrication path 30a of small diameter over a comparatively long distance from the surface of the left and right side surfaces of the end plate 5 to the second lubrication path 30b positioned in the central portion of the horizontal portion 5a of the end plate 5. The establishment of such technology has enabled an average division of supply of a lubricant among each of rolling element circulation paths (outer direction change path 6-1 and inner direction change path 6-2) and hence made it possible to realize appropriate lubrication, whatever place a mounting position of a greasing nipple on an end plate is, and whatever kind the lubricant is.

That concludes description of the preferred embodiments of the present invention, but the technical scope of the present invention is not limited to the scope of what is described in the aforementioned embodiments. Various modifications and improvements may be added to the aforementioned embodiments.

For example, the above-mentioned embodiments are described exemplifying the case where the built-up portion 52a built-up and appended in the thinned-down portion 52 of the end plate 5 is formed as a linear semi-cylindrical shape. However, a shape or place and range of formation, and so on, of the built-up portion 52a can be changed arbitrarily according to conditions of the end plate 5, and so on.

In addition, a shape of the built-up portion 52a specifically exemplified in FIGS. 4 and 6 may be changed arbitrarily according to a shape of the end plate 5 or mold manufacture restrictions, and so on.

Moreover, in the present embodiments, examples are shown of a linear guide. However, the motion guide device of the present embodiment may be applied to all forms of motion guide device such as a spline device and so on, in a range enabling display of the above-mentioned good operational effects.

It is clear from the descriptions of the claims that forms supplemented by such modifications or improvements may also be included in the technical scope of the present invention.

REFERENCE NUMERALS 1 track rail
1b roller rolling surface (rolling element rolling unit)
1c narrowed surface
2 moving block
2d load roller rolling surface (load rolling element rolling unit)
3 roller (rolling element)
5 end plate (cover member)
6 direction change path
7 load roller rolling path (load rolling element rolling path)
8 roller return path (rolling element return path)
24 inner/outer direction change path configuring member
25 cage guide member
26 inner direction change path configuring member
30 lubrication path
30a first lubrication path
$30a_1$ lower hole
30b second lubrication path
30c third lubrication path
51 seal plate
52 thinned-down portion
52a built-up portion
501 moving block mounting surface
502 opposing moving block mounting surface

The invention claimed is:
1. A motion guide device, comprising:
a track member in which a rolling element rolling unit is formed;
a moving block in which a load rolling element rolling unit is formed and including a rolling element return path, the load rolling element rolling unit opposing the rolling element rolling unit, and the rolling element return path extending substantially parallel to the load rolling element rolling unit;
a pair of cover members formed at both of front and rear ends in a moving direction of the moving block and including a direction change path connecting the load rolling element rolling unit and the rolling element return path;
a plurality of rolling elements arranged in a freely rolling manner within a rolling element circulation path configured by the load rolling element rolling unit, the rolling element return path, and the direction change path; and
a lubrication path provided in at least one of the pair of cover members and configured to supply a lubricant to the rolling element circulation path,
wherein the lubrication path includes:
a first lubrication path extending in a horizontal direction from a surface of at least one of left and right side surfaces parallel to a longer direction of the track member in the cover member to a central portion of the cover member;
a second lubrication path connected to the first lubrication path and formed in the central portion of the cover member; and
a third lubrication path connected to the second lubrication path and formed in a groove shape in a moving block mounting surface of the cover member to thereby cooperate with the moving block to form a path from the second lubrication path of the lubrication path to the rolling element circulation path, and
wherein the first lubrication path is formed in a hollow shape continuous to inside a built-up portion projecting from a thinned-down portion of the cover member.
2. The motion guide device according to claim 1, wherein the moving block mounting surface of the pair of cover members is formed in a planar shape, and
wherein the thinned-down portion is formed in an opposing moving block mounting surface which is an opposing surface of the moving block mounting surface.

3. The motion guide device according to claim 1 or 2,
wherein the second lubrication path is positioned in the central portion of a horizontal portion of the cover member, and
wherein the third lubrication path is capable of supplying the lubricant substantially uniformly by all of the groove shapes linking the second lubrication path and a plurality of the rolling element circulation paths.

4. A motion guide device, comprising:
a track member in which a rolling element rolling unit is formed;
a moving block in which a load rolling element rolling unit is formed and including a rolling element return path, the load rolling element rolling unit opposing the rolling element rolling unit, and the rolling element return path extending substantially parallel to the load rolling element rolling unit;
a pair of cover members formed at both of front and rear ends in a moving direction of the moving block and including a direction change path connecting the load rolling element rolling unit and the rolling element return path;
a plurality of rolling elements arranged in a freely rolling manner within a rolling element circulation path configured by the load rolling element rolling unit, the rolling element return path, and the direction change path; and
a lubrication path provided in at least one of the pair of cover members and configured to supply a lubricant to the rolling element circulation path,
wherein a moving block mounting surface of the pair of cover members is formed in a planar shape and a thinned-down portion is formed in an opposing moving block mounting surface which is an opposing surface of the moving block mounting surface,
wherein a built-up portion projects from the thinned-down portion of the cover members to form a part of the lubrication path, and
wherein a lower hole is formed in the built-up portion to guide a tool during processing of the lubrication path.

5. A method of manufacturing a cover member for a motion guide device, the method comprising:
forming a cover member including
a direction change path adapted to connect a load rolling element rolling unit and a rolling element return path,
a moving block mounting surface having a planar shape, and
an opposing moving block mounting surface being an opposing surface of said moving block mounting surface, said opposing moving block mounting surface including a built-up portion which projects from a thinned-down portion,
forming a lower hole in said built-up portion, and
forming a hole in said built-up portion using said lower hole as a guide, to thereby form at least a part of a lubrication path provided in said cover member and configured to supply a lubricant to a rolling element circulation path.

6. A cover member for a motion guide device, comprising:
a direction change path adapted to connect a load rolling element rolling unit and a rolling element return path,
a moving block mounting surface having a planar shape,
an opposing moving block mounting surface being an opposing surface of said moving block mounting surface, said opposing moving block mounting surface including a built-up portion which projects relative to a thinned-down portion, and
a lubrication path configured to supply a lubricant to a rolling element circulation path,
wherein the lubrication path includes:
a first lubrication path extending in a horizontal direction from a surface of at least one of left and right side surfaces parallel to a longer direction of a track member in the cover member to a central portion of the cover member;
a second lubrication path connected to the first lubrication path and formed in the central portion of the cover member; and
a third lubrication path connected to the second lubrication path and formed in a groove shape in a moving block mounting surface of the cover member to thereby cooperate with the moving block to form a path from the second lubrication path of the lubrication path to the rolling element circulation path, and
wherein the first lubrication path is formed in a hollow shape continuous to inside a built-up portion projecting from a thinned-down portion of the cover member.

7. The cover member according to claim 6,
wherein the second lubrication path is positioned in the central portion of a horizontal portion of the cover member, and
wherein the third lubrication path is capable of supplying the lubricant substantially uniformly by all of the groove shapes linking the second lubrication path and a plurality of the rolling element circulation paths.

8. A cover member for a motion guide device, comprising:
a direction change path adapted to connect a load rolling element rolling unit and a rolling element return path,
a moving block mounting surface having a planar shape,
an opposing moving block mounting surface being an opposing surface of said moving block mounting surface, said opposing moving block mounting surface including a built-up portion which projects relative to a thinned-down portion, and
a lubrication path configured to supply a lubricant to a rolling element circulation path,
wherein a moving block mounting surface is formed in a planar shape and a thinned-down portion is formed in an opposing moving block mounting surface which is an opposing surface of the moving block mounting surface,
wherein a built-up portion projects from the thinned-down portion to form a part of the lubrication path, and
wherein a lower hole is formed in the built-up portion to guide a tool during processing of the lubrication path.

9. A method of manufacturing a motion guide device, the method comprising:
forming a cover member including
a direction change path adapted to connect a load rolling element rolling unit and a rolling element return path,
a moving block mounting surface having a planar shape, and
an opposing moving block mounting surface being an opposing surface of said moving block mounting surface, said opposing moving block mounting surface including a built-up portion which projects relative to a thinned-down portion,
forming a lower hole in said built-up portion,
processing a hole in said built-up portion using said lower hole as a guide, to thereby form at least a part of a lubrication path provided in said cover member and configured to supply a lubricant to a rolling element circulation path, and assembling said cover member with
- a track member in which a rolling element rolling unit is formed;
- a moving block in which a load rolling element rolling unit is formed and including a rolling element return path, the load rolling element rolling unit opposing the rolling element rolling unit, and the rolling element return path extending substantially parallel to the load rolling element rolling unit; and
- a plurality of rolling elements arranged in a freely rolling manner within a rolling element circulation path configured by the load rolling element rolling unit, the rolling element return path, and the direction change path.

* * * * *